United States Patent
Mirzaee Kakhki

(10) Patent No.: US 11,472,625 B2
(45) Date of Patent: Oct. 18, 2022

(54) METHOD AND SYSTEM FOR MAINTAINING TEMPERATURE-SENSITIVE MATERIALS WITHIN A DESIRED TEMPERATURE RANGE FOR A PERIOD OF TIME

(71) Applicant: Cold Chain Technologies, LLC, Franklin, MA (US)

(72) Inventor: Iman Mirzaee Kakhki, Wayland, MA (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 0 days.

(21) Appl. No.: 16/936,188

(22) Filed: Jul. 22, 2020

(65) Prior Publication Data

US 2021/0024270 A1 Jan. 28, 2021

Related U.S. Application Data

(60) Provisional application No. 62/877,711, filed on Jul. 23, 2019.

(51) Int. Cl.
*B65D 81/38* (2006.01)
*B65D 81/18* (2006.01)

(52) U.S. Cl.
CPC ......... *B65D 81/18* (2013.01); *B65D 81/3816* (2013.01)

(58) Field of Classification Search
CPC ............ B65D 81/3834; B65D 81/3827; B65D 81/3825; B65D 81/3823

(Continued)

(56) References Cited

U.S. PATENT DOCUMENTS

| 5,899,088 A | 5/1999 | Purdum |
| 5,924,302 A | 7/1999 | Derifield |

(Continued)

FOREIGN PATENT DOCUMENTS

| FR | 2847237 A1 * | 5/2004 | ............... F25D 3/08 |
| WO | 9712100 A1 | 4/1997 | |

(Continued)

OTHER PUBLICATIONS

Catalog for Thermosafe Temperature Assurance Solutions, SCA Packaging North America, Arlington Heights, Illinois (2004).

(Continued)

*Primary Examiner* — Allan D Stevens
(74) *Attorney, Agent, or Firm* — Kriegsman & Kriegsman

(57) ABSTRACT

Method and system for maintaining temperature-sensitive materials. According to one embodiment, the method involves positioning temperature-sensitive materials within a product box and positioning phase-change material around the product box. If the edges of the product box where adjoining sides meet are covered by phase-change material, then the product box and the phase-change materials are loaded into a frame-and-panel-type insulated container in which an insulating material having a higher R-value is located along the container edges and an insulating material having a lower R-value is spaced away from the container edges. By contrast, if the edges of the product box are not covered by phase-change material, then the product box and the phase-change materials are loaded into a frame-and-panel-type insulated container in which an insulating material having a lower R-value is located along the container edges and an insulating material having a higher R-value is spaced away from the container edges.

9 Claims, 9 Drawing Sheets

(58) Field of Classification Search
USPC .................................................. 220/592.26
See application file for complete search history.

(56) References Cited

U.S. PATENT DOCUMENTS

| | | | |
|---|---|---|---|
| 6,116,042 | A | 9/2000 | Purdum |
| 6,482,332 | B1 | 11/2002 | Malach |
| 6,868,982 | B2 | 3/2005 | Gordon |
| 6,875,486 | B2 | 4/2005 | Miller |
| 7,257,963 | B2 | 8/2007 | Mayer |
| 8,250,882 | B2 | 8/2012 | Mustafa et al. |
| 8,607,581 | B2 | 12/2013 | Williams et al. |
| 8,938,986 | B2 | 1/2015 | Matta et al. |
| 9,045,278 | B2 | 6/2015 | Mustafa et al. |
| 9,180,998 | B2 | 11/2015 | Banks et al. |
| 9,366,469 | B2 | 6/2016 | Chapman, Jr. |
| 9,429,350 | B2 | 8/2016 | Chapman, Jr. |
| 9,556,373 | B2 | 1/2017 | Formato et al. |
| 9,598,622 | B2 | 3/2017 | Formato et al. |
| 9,828,165 | B2 | 11/2017 | Ranade et al. |
| 10,077,389 | B2 | 9/2018 | Formato et al. |
| 10,287,085 | B2 | 5/2019 | Kuhn |
| 10,288,337 | B2 | 5/2019 | Blezard et al. |
| 10,501,254 | B2 | 12/2019 | Wood et al. |
| 10,583,978 | B2 | 3/2020 | Longley et al. |
| 10,604,326 | B2 | 3/2020 | Longley et al. |
| 10,661,969 | B2 | 5/2020 | Pranadi et al. |
| 10,829,675 | B2 | 11/2020 | Formato et al. |
| 2009/0078708 | A1 | 3/2009 | Williams |
| 2010/0314397 | A1 | 12/2010 | Williams et al. |
| 2011/0147391 | A1* | 6/2011 | Corder ............... B65D 81/3823 220/592.27 |
| 2011/0290792 | A1 | 12/2011 | Krzak et al. |
| 2014/0021208 | A1* | 1/2014 | Anti ..................... A01N 1/0273 220/592.25 |
| 2014/0033759 | A1* | 2/2014 | Ide ............................ F25D 3/00 62/457.2 |
| 2014/0311170 | A1* | 10/2014 | Mills ..................... F25D 11/003 62/62 |
| 2015/0191291 | A1 | 7/2015 | Wood et al. |
| 2016/0362240 | A1 | 12/2016 | Ferracamo, Jr. |
| 2017/0082344 | A1 | 3/2017 | Tansley |
| 2017/0121097 | A1 | 5/2017 | Pranadi et al. |
| 2017/0240337 | A1 | 8/2017 | Austerberry et al. |
| 2018/0093816 | A1 | 4/2018 | Longley et al. |
| 2018/0100682 | A1 | 4/2018 | Nilsen et al. |
| 2018/0283761 | A1* | 10/2018 | Buttiker ............... A01N 1/0273 |
| 2018/0320947 | A1 | 11/2018 | Jain et al. |
| 2018/0328644 | A1 | 11/2018 | Rizzo et al. |
| 2019/0210790 | A1 | 7/2019 | Rizzo et al. |
| 2020/0002075 | A1 | 1/2020 | Lee et al. |
| 2020/0047993 | A1 | 2/2020 | Brabbs et al. |
| 2020/0231362 | A1 | 7/2020 | Kulangara et al. |
| 2020/0290790 | A1* | 9/2020 | Mowery ............ B65D 81/3823 |
| 2020/0307896 | A1 | 10/2020 | Pranadi et al. |
| 2020/0324959 | A1 | 10/2020 | Longley et al. |
| 2020/0331686 | A1 | 10/2020 | Longley et al. |
| 2020/0408453 | A1 | 12/2020 | Martino |
| 2021/0070539 | A1 | 3/2021 | Chasteen et al. |
| 2021/0094750 | A1 | 4/2021 | Kuhn et al. |
| 2021/0331834 | A1 | 10/2021 | Longley et al. |
| 2022/0002070 | A1 | 1/2022 | Moghaddas et al. |

FOREIGN PATENT DOCUMENTS

| | | |
|---|---|---|
| WO | 2015044668 A1 | 4/2015 |
| WO | 2018213348 A2 | 11/2018 |

OTHER PUBLICATIONS

U.S. Appl. No. 16/246,435, inventors James Robert Chasteen et al., filed Jan. 11, 2019.
U.S. Appl. No. 17/213,040, inventor Henry R. Melchor, filed Mar. 25, 2021.
U.S. Appl. No. 17/585,139, inventors James Nilsen et al., filed Jan. 26, 2022.
U.S. Appl. No. 17/675,251, inventors Heather M. Conway et al., filed Feb. 18, 2022.
U.S. Appl. No. 17/687,382, inventors James R Chasteen et al., filed Mar. 4, 2022.
U.S. Appl. No. 17/726,318, inventors Henry Melchor et al., filed Apr. 21, 2022.

* cited by examiner

METHOD AND SYSTEM FOR MAINTAINING TEMPERATURE-SENSITIVE MATERIALS WITHIN A DESIRED TEMPERATURE RANGE FOR A PERIOD OF TIME

CROSS-REFERENCE TO RELATED APPLICATIONS

The present application claims the benefit under 35 U.S.C. 119(e) of U.S. Provisional Patent Application No. 62/877,711, inventor Iman Mirzaee Kakhki, filed Jul. 23, 2019, the disclosure of which is incorporated herein by reference.

BACKGROUND OF THE INVENTION

The present invention relates generally to methods and systems for maintaining temperature-sensitive materials within a desired temperature range for a period of time and relates more particularly to a novel method and system for maintaining temperature-sensitive materials within a desired temperature range for a period of time.

There is a continuing need for systems that can maintain temperature-sensitive materials within a desired temperature range for an extended period of time. For example, many pharmaceuticals, foods, medical devices, beverages, and other temperature-sensitive materials must be maintained within a particular temperature range (such as, for example, +2° C. to +8° C.) in order to prevent the spoilage of such materials. As can readily be appreciated, the maintenance of such materials within a desired temperature range while such materials are being transported can be challenging.

One way to maintain temperature-sensitive materials within a desired temperature range is by positioning the temperature-sensitive materials within a thermal shipper. Typically, a thermal shipper comprises a thermally insulated container and one or more preconditioned passive temperature-control members (e.g., ice packs, gel packs, phase-change material (PCM) packs, and the like) that are placed within the thermally insulated container with the temperature-sensitive materials. As can readily be appreciated, the efficacy of the thermal shipper depends, in part, on the thermally insulating quality of the thermally insulated container. The thermally insulating quality of the thermally insulated container, in turn, depends, in part, on the type of insulating material of which the container is made, with some thermal insulating materials exhibiting superior thermal insulating properties as compared to other thermal insulating materials. For example, some thermal insulating materials, such as vacuum insulated panels (VIP), tend to have comparatively greater thermal insulating properties (i.e., comparatively high "R-values") whereas other materials, such as expanded polystyrene (EPS) and expanded polypropylene (EPP), tend to have comparatively lesser thermal insulating properties (i.e., comparatively low "R-values"), and still other materials, such as polyurethane foam, tend to have thermal insulating properties that are intermediate to those of VIP and EPS/EPP (i.e., comparatively intermediate "R-values"). However, not unsurprisingly, materials with higher R-values tend to be more expensive than materials with lower R-values. As a result, when designing a thermally insulated container, one often has to make a decision as to whether to select a material with a comparatively higher R-value or to select a material with a comparatively lower price.

Documents that may be of interest may include the following, all of which are incorporated herein by reference: U.S. Pat. No. 10,287,085 B2, inventor Kuhn, which issued May 14, 2019; U.S. Pat. No. 9,828,165 B2, inventors Ranade et al., which issued Nov. 28, 2017; U.S. Pat. No. 9,429,350 B2, inventor Chapman, Jr., which issued Aug. 30, 2016; U.S. Pat. No. 9,366,469 B2, inventor Chapman, Jr., which issued Jun. 14, 2016; U.S. Pat. No. 9,045,278 B2, inventors Mustafa et al., which issued Jun. 2, 2015; U.S. Pat. No. 8,938,986 B2, inventors Matta et al., which issued Jan. 27, 2015; U.S. Pat. No. 8,607,581 B2, inventors Williams et al., which issued Dec. 17, 2013; U.S. Pat. No. 8,250,882 B2, inventors Mustafa et al., which issued Aug. 28, 2012; U.S. Pat. No. 7,257,963 B2, inventor Mayer, which issued Aug. 21, 2007; U.S. Pat. No. 6,875,486 B2, inventor Miller, which issued Apr. 5, 2005; U.S. Pat. No. 6,482,332 B1, inventor Malach, which issued Nov. 19, 2002; U.S. Pat. No. 6,116,042, inventor Purdum, which issued Sep. 12, 2000; U.S. Pat. No. 5,924,302, inventor Derifield, which issued Jul. 20, 1999; U.S. Pat. No. 5,899,088, inventor Purdum, which issued May 4, 1999; U.S. Patent Application Publication No. US 2019/0210790 A1, inventors Anthony Rizzo et al., which published Jul. 11, 2019; U.S. Patent Application Publication No. US 2020/0002075 A1, inventors TzeHo Lee et al., which published Jan. 2, 2020; U.S. Patent Application Publication No. US 2018/0320947 A1, inventors Jain et al., which published Nov. 8, 2018; U.S. Patent Application Publication No. US 2018/0093816 A1, inventors Longley et al., which published Apr. 5, 2018; U.S. Patent Application Publication No. US 2017/0121097 A1, inventors Pranadi et al., which published May 4, 2017; U.S. Patent Application No. US 2017/0082344 A1, inventors Tansley, which published Mar. 23, 2017; U.S. Patent Application Publication No. US 2016/0362240 A1, inventors Ferracamo, Jr., which published Dec. 15, 2016; U.S. Patent Application Publication No. US 2011/0290792 A1, inventors Krzak et al., which published Dec. 1, 2011; U.S. Patent Application Publication No. US 2009/0078708 A1, inventor Williams, which published Mar. 26, 2009; PCT International Publication No. WO 2018/213348 A2, published Nov. 22, 2018; PCT International Publication No. WO 2015/044668 A1, published Apr. 2, 2015; and PCT International Publication No. WO 97/12100 A1, published Apr. 3, 1997.

SUMMARY OF THE INVENTION

It is an object of the present invention to provide a novel method and system for maintaining temperature-sensitive materials within a desired temperature range for a period of time.

According to one aspect of the invention, there is provided a system for maintaining temperature-sensitive materials within a desired temperature range for a period of time, the system comprising (a) a product box, the product box being shaped to comprise a plurality of sides, wherein adjoining sides of the product box meet at an edge; (b) at least one passive temperature-control member, the at least one passive temperature-control member comprising at least one phase-change material, wherein the at least one passive temperature-control member is positioned relative to the product box so that the at least one phase-change material does not cover any edges of the product box; (c) an insulated container, the insulated container being shaped to include a plurality of sides, wherein adjoining sides of the insulated container meet at an interior edge and at an exterior edge, wherein the plurality of sides collectively define a cavity for receiving the product box and the at least one passive temperature-control member, the insulated container comprising a first insulating material and a second insulating material, wherein the first insulating material has a comparatively higher R-value, wherein the second insulating material has a comparatively lower R-value, and wherein the insulated container is devoid of the first insulating material between the interior edge and the exterior edge of adjoining sides.

In a more detailed feature of the invention, the product box may be rectangular in shape and may comprise six sides.

In a more detailed feature of the invention, the at least one passive temperature-control member may comprise a plurality of passive temperature-control members.

In a more detailed feature of the invention, the product box may have six sides, and the at least one phase-change material may be positioned along an exterior portion of each of the six sides of the product box but not along any of the edges.

In a more detailed feature of the invention, the at least one phase-change material may be exactly one type of phase-change material.

In a more detailed feature of the invention, the at least one phase-change material may comprise a plurality of different types of phase-change material.

In a more detailed feature of the invention, the first insulating material may comprise a vacuum insulated panel, and the second insulating material may comprise at least one material selected from the group consisting of expanded polystyrene, expanded polypropylene, and a polyurethane foam.

In a more detailed feature of the invention, the first insulating material may comprise a polyurethane foam, and the second insulating material may comprise at least one material selected from the group consisting of expanded polystyrene and expanded polypropylene.

In a more detailed feature of the invention, the insulated container may comprise an outer receptacle, an inner receptacle, and a plurality of panels; the inner receptacle may be disposed within the outer receptacle; the plurality of panels may be disposed between the inner receptacle and the outer receptacle; each of the outer receptacle and the inner receptacle may comprise the second insulating material; and the plurality of panels may comprise the first insulating material.

According to another aspect of the invention, there is provided a system for maintaining temperature-sensitive materials within a desired temperature range for a period of time, the system comprising (a) a product box, the product box being shaped to comprise a plurality of sides, wherein adjoining sides of the product box meet at an edge; (b) at least one passive temperature-control member, the at least one passive temperature-control member comprising at least one phase-change material, wherein the at least one passive temperature-control member is positioned relative to the product box so that the at least one phase-change material covers the edges of the product box; (c) an insulated container, the insulated container being shaped to include a plurality of sides, wherein adjoining sides of the insulated container meet at an interior edge and at an exterior edge, wherein the plurality of sides collectively define a cavity for receiving the product box and the at least one passive temperature-control member, the insulated container comprising a first insulating material and a second insulating material, wherein the first insulating material has a comparatively higher R-value, wherein the second insulating material has a comparatively lower R-value, and wherein the insulated container is devoid of the second insulating material between the interior edge and the exterior edge of adjoining sides.

In a more detailed feature of the invention, the product box may be rectangular in shape and may comprise six sides.

In a more detailed feature of the invention, the at least one passive temperature-control member may comprise a plurality of passive temperature-control members.

In a more detailed feature of the invention, the product box may have six sides, and the at least one phase-change material may be positioned along an exterior portion of each of the six sides of the product box and along all of the edges.

In a more detailed feature of the invention, the at least one phase-change material may be exactly one type of phase-change material.

In a more detailed feature of the invention, the at least one phase-change material may comprise a plurality of different types of phase-change material.

In a more detailed feature of the invention, the first insulating material may comprise a vacuum insulated panel, and the second insulating material may comprise at least one material selected from the group consisting of expanded polystyrene, expanded polypropylene, and a polyurethane foam.

In a more detailed feature of the invention, the first insulating material may comprise a polyurethane foam, and the second insulating material may comprise at least one material selected from the group consisting of expanded polystyrene and expanded polypropylene.

In a more detailed feature of the invention, the insulated container may comprise a base, a cover, and a plurality of panels; the base and the cover may jointly define a receptacle; the plurality of panels may be disposed within the receptacle; each of the base and the cover may comprise the first insulating material; and the plurality of panels may comprise the second insulating material.

According to another aspect of the invention, there is provided a method for maintaining temperature-sensitive materials within a desired temperature range for a period of time, the method comprising the steps of (a) providing a product box and at least one passive temperature-control member, the product box being shaped to comprise a plurality of sides, wherein adjoining sides of the product box meet at an edge, the at least one passive temperature-control member comprising at least one phase-change material; (b) positioning the temperature-sensitive materials within the product box; (c) determining if the edges of the product box where adjoining sides meet are covered by the at least one phase-change material; (d) wherein, if the edges of the product box where adjoining sides meet are not covered by the at least one phase-change material, positioning the product box and the at least one phase-change material in a first insulated container, the first insulated container being shaped to include a plurality of sides, wherein adjoining sides of the first insulated container meet at an interior edge and at an exterior edge, wherein the plurality of sides collectively define a cavity for receiving the product box and the at least one passive temperature-control member, the first insulated container comprising a first insulating material and a second insulating material, wherein the first insulating material has a comparatively higher R-value, wherein the second insulating material has a comparatively lower R-value, and wherein the first insulated container is devoid of the first insulating material between the interior edge and the exterior edge of adjoining sides; and (e) wherein, if the edges of the product box where adjoining sides meet are covered by the at least one phase-change material, positioning the product box and the at least one phase-change material in a second insulated container, the second insulated container being shaped to include a plurality of sides, wherein adjoining sides of the second insulated container meet at an interior edge and at an exterior edge, wherein the plurality of sides collectively define a cavity for receiving the product box and the at least one passive temperature-control member, the second insulated container comprising a first insulating material and a second insulating material, wherein the first insulating material has a comparatively higher R-value, wherein the second insulating material has a comparatively lower R-value, and wherein the second insulated container is devoid of the second insulating material between the interior edge and the exterior edge of adjoining sides.

In a more detailed feature of the invention, the product box may be rectangular in shape and may comprise six sides.

In a more detailed feature of the invention, the at least one passive temperature-control member may comprise a plurality of passive temperature-control members.

In a more detailed feature of the invention, the product box may have six sides, and the at least one phase-change material may be positioned along an exterior portion of each of the six sides of the product box.

In a more detailed feature of the invention, the at least one phase-change material may be exactly one type of phase-change material.

In a more detailed feature of the invention, the at least one phase-change material may comprise a plurality of different types of phase-change material.

In a more detailed feature of the invention, the first insulating material may comprise a vacuum insulated panel, and the second insulating material may comprise at least one material selected from the group consisting of expanded polystyrene, expanded polypropylene, and a polyurethane foam.

In a more detailed feature of the invention, the first insulating material may comprise a polyurethane foam, and the second insulating material may comprise at least one material selected from the group consisting of expanded polystyrene and expanded polypropylene.

In a more detailed feature of the invention, the first insulated container may comprise an outer receptacle, an inner receptacle, and a plurality of panels; the inner receptacle may be disposed within the outer receptacle; the plurality of panels may be disposed between the inner receptacle and the outer receptacle; each of the outer receptacle and the inner receptacle may comprise the second insulating material; and the plurality of panels may comprise the first insulating material.

In a more detailed feature of the invention, the second insulated container may comprise a base, a cover, and a plurality of panels; the base and the cover may jointly define a receptacle; the plurality of panels may be disposed within the receptacle; each of the base and the cover may comprise the first insulating material; and the plurality of panels may comprise the second insulating material.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numerals represent like parts.

DETAILED DESCRIPTION OF THE INVENTION

Figure 1:
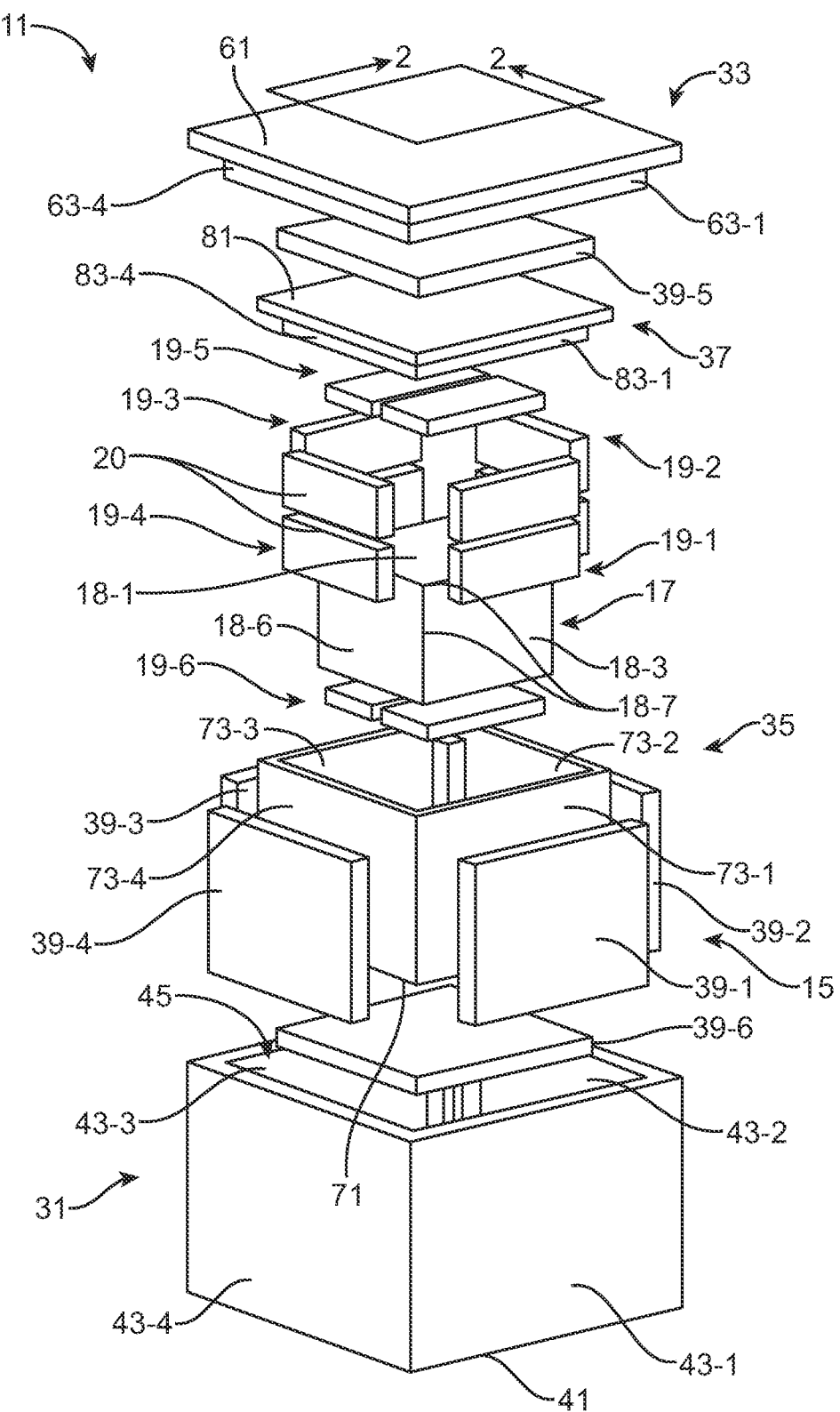
FIG. 1 is an exploded perspective view of a first embodiment of a system constructed according to the teachings of the present invention for maintaining temperature-sensitive materials within a desired temperature range for a period of time.

The present invention is directed at the design of a thermally insulated container that includes at least two different types of thermally insulating materials, one of the at least two different types of thermally insulating materials having a comparatively higher R-value and another of the at least two different types of thermally insulating materials having a comparatively lower R-value. More specifically, according to the present invention, the at least two different types of thermally insulating materials are preferably unevenly distributed within the thermally insulated container.

For example, in some cases, one of the at least two different types of thermally insulating materials is only located at a first set of locations (e.g., along the interfaces or edges of adjoining sides of the container), and another of the at least two different types of thermally insulating materials is only located at a second set of locations (e.g., within a central portion of each side of the container that is spaced inwardly from the interfaces of adjoining sides of the container). Alternatively, in other cases, one of the at least two different types of thermally insulating materials has a comparatively greater thickness at a first set of locations (e.g., along the interfaces of adjoining sides of the container) and a comparatively lesser thickness (i.e., reduced thickness or non-existent thickness) at a second set of locations (e.g., within a central portion of each side of the container that is spaced inwardly from the interfaces of adjoining sides of the container), and another of the at least two thermally insulating materials conversely has a comparatively greater thickness at the second set of locations (e.g., within a central portion of each side of the container that is spaced inwardly from the interfaces of adjoining sides of the container) and a comparatively lesser thickness (i.e., reduced thickness or non-existent thickness) at the first set of locations (e.g., along the interfaces of adjoining sides of the container).

Moreover, in accordance with the present invention, it has unexpectedly been found that, in different types of situations, certain arrangements of the at least two different types of thermally insulating materials may be thermally preferred over other arrangements. For example, where passive temperature-control members (e.g., ice packs, gel packs, phase-change material (PCM) packs, and the like) are significantly spaced apart from one another along adjacent sides of a payload, it may be preferable to use an arrangement in which (i) the thickness of a thermally insulating material having a comparatively lower R-value is greater along the interfaces of adjoining sides of the container and is lesser along central portions of the sides of the container and (ii) the thickness of a thermally insulating material having a comparatively higher R-value is greater within a central portion of each side of the container and is lesser along the interfaces of adjoining sides of the container.

On the other hand, where passive temperature-control members (e.g., ice packs, gel packs, phase-change material (PCM) packs, and the like) are in contact with one another along adjacent sides of the payload or are very closely positioned to one another along adjacent sides of the payload, it may be preferable to use an arrangement in which (i) the thickness of a thermally insulating material having a comparatively greater R-value is greater along the interfaces of adjoining sides of the container and is lesser along central portions of the sides of the container and (ii) the thickness of a thermally insulating material having a comparatively lower R-value is greater within a central portion of each side of the container and is lesser along the interfaces of adjoining sides of the container.

Alternatively stated, the present invention may employ an insulated container having a "frame and panel construction," with a first type of insulating material only being present within the panel of each side and with a second type of insulating material being present within the frame located at the edges of adjoining sides. (The second type of insulating material may additionally be present in the panel portions as well, for example, underlaying or overlaying the first material present in the panel.) Where a phase-change material is positioned so as to overlay the edges of the product box, the first type of material may be an insulating material having a comparatively lower R-value, and the second type of material may be an insulating material having a comparatively higher R-value. By contrast, where no phase-change material is positioned over the edges of the product box, the first type of material may be an insulating material having a comparatively higher R-value, and the second type of material may be an insulating material having a comparatively lower R-value.

Figure 2:
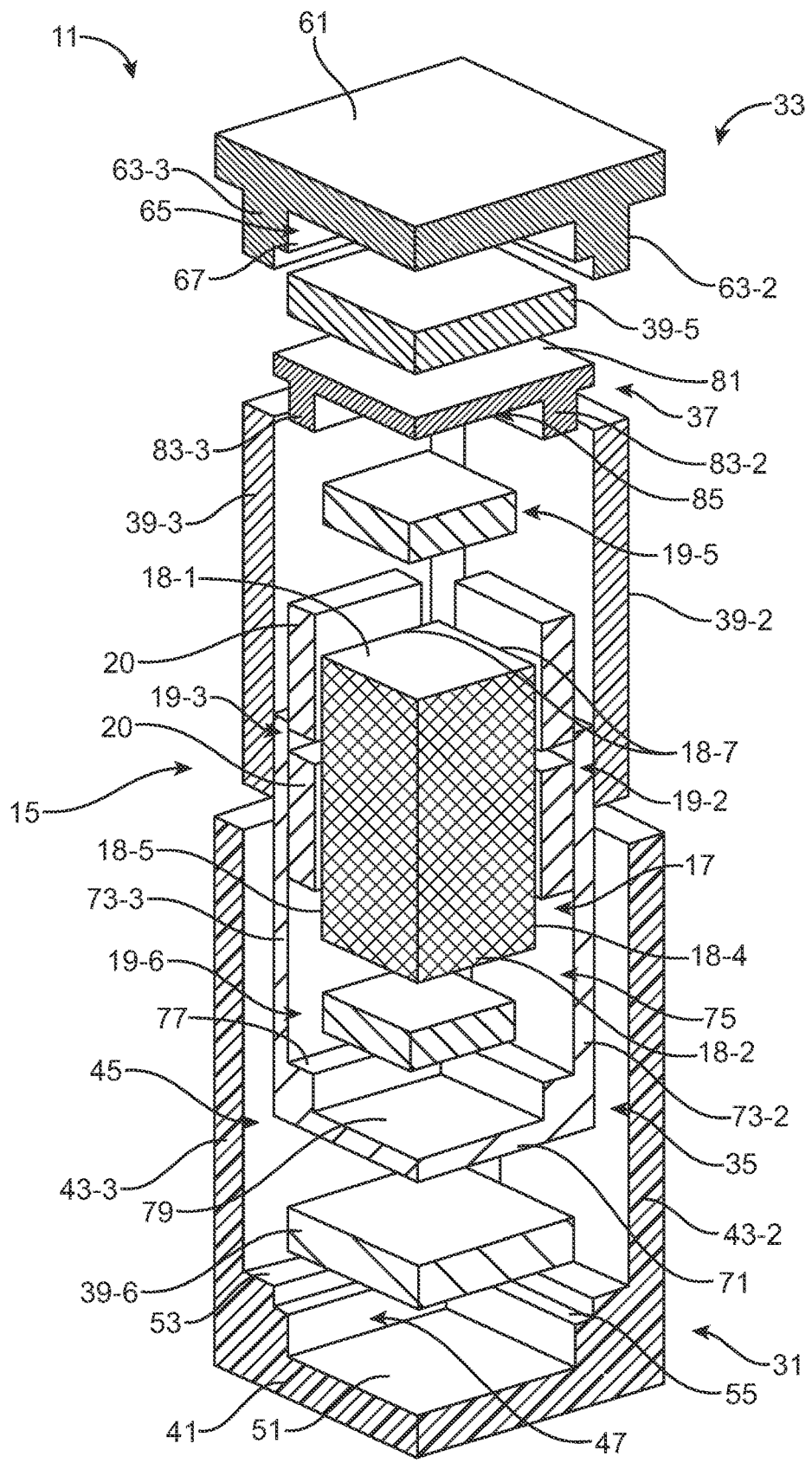
FIG. 2 is an exploded perspective view of the system of FIG. 1, the system being shown in section as a ¼-cut plane view.
Figure 3:
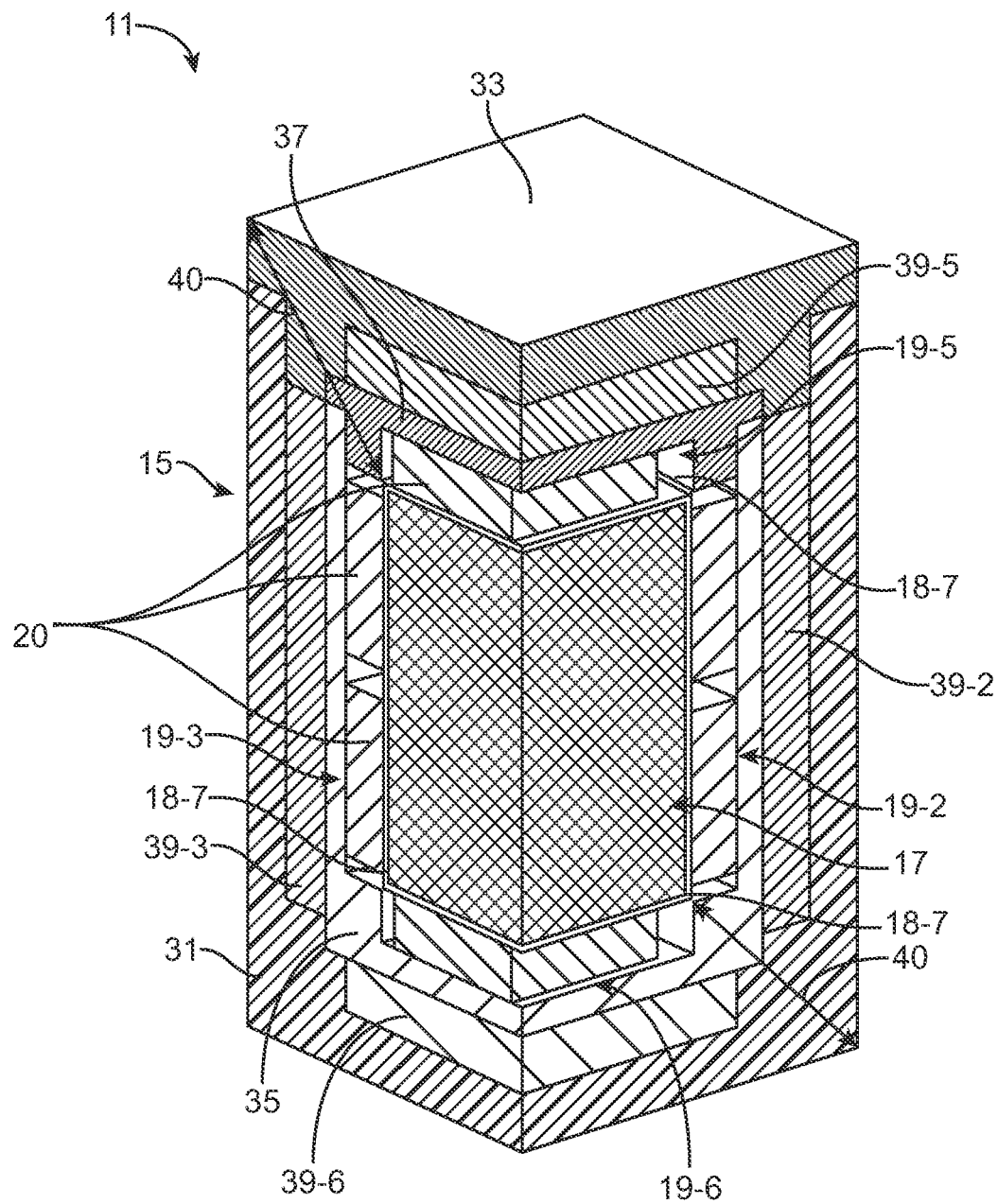
FIG. 3 is a perspective view of the system shown in FIG. 1, the system being shown in section as a ¼-cut plane view.

Referring now to FIGS. 1 through 3, there are shown various views of a first embodiment of a system for maintaining temperature-sensitive materials within a desired temperature range for a period of time, the system being constructed according to the teachings of the present invention and being represented generally by reference numeral 11. For clarity and/or ease of illustration, certain details of system 11 that are discussed elsewhere in this application or that are not critical to an understanding of the invention may be omitted from one or more of FIGS. 1 through 3 and/or the accompanying description herein or may be shown in FIGS. 1 through 3 and/or described herein in a simplified manner.

System 11 may comprise an outer box (not shown), an insulated container 15, a product box 17, and a plurality of passive temperature-control members 19-1 through 19-6.

The outer box, which may be, for example, a conventional corrugated cardboard box or carton, may comprise a rectangular prismatic cavity bounded by a plurality of rectangular side walls, a plurality of bottom closure flaps, and a plurality of top closure flaps. Adhesive strips of tape or other closure means may be used to retain, in a closed condition, the bottom closure flaps and/or top closure flaps.

Insulated container 15, which may be snugly, but removably, disposed within the outer box, may comprise an outer base 31, an outer cover 33, an inner base 35, an inner cover 37, and a plurality of panels 39-1 through 39-6.

Outer base 31, which may be in the form of a unitary or one-piece member, may comprise a bottom wall 41, a plurality of side walls 43-1 through 43-4 extending upwardly from bottom wall 41, and an open top. Bottom wall 41 and side walls 43-1 through 43-4 may jointly define a cavity 45. In addition, bottom wall 41 and side walls 43-1 through 43-4 may jointly define a projection 47, which may extend continuously around the interior of outer base 31 at the interface of bottom wall 41 and side walls 43-1 through 43-4. Projection 47 may circumscribe a recessed area 51 on bottom wall 41, wherein recessed area 51 may be dimensioned to snugly, yet removably, receive panel 39-6. In addition, projection 47 may be shaped to include an upper step 53, upon which panels 39-1 through 39-4 may be snugly, yet removably, seated, and a lower step 55, upon which inner base 35 may be snugly, yet removably, seated.

Outer cover 33, which may be in the form of a unitary or one-piece member, may comprise a top wall 61, a plurality of side walls 63-1 through 63-4 extending downwardly from top wall 61, and an open bottom. Top wall 61 may be dimensioned to sit flush on top of side walls 43-1 through 43-4 of outer base 31. Side walls 63-1 through 63-4 may be spaced inwardly from the periphery of top wall 61 so as to be snugly, yet removably, received within side walls 43-1 through 43-4 of outer base 31. Side walls 63-1 through 63-4 may be seated on top of panels 39-1 through 39-4, respectively. Side walls 63-1 through 63-4 may continuously circumscribe an area 65 on top wall 61, wherein area 65 may be dimensioned to snugly, yet removably, receive panel

39-5. Each of side walls 63-1 through 63-4 may include a step 67, which may be used to snugly, yet removably, receive inner cover 37.

Inner base 35, which may be in the form of a unitary or one-piece member, may comprise a bottom wall 71, a plurality of side walls 73-1 through 73-4 extending upwardly from bottom wall 71, and an open top. Bottom wall 71 and side walls 73-1 through 73-4 may jointly define a cavity 75. In addition, bottom wall 71 and side walls 73-1 through 73-4 may jointly define a step 77, which may extend continuously around the interior of inner base 35 at the interface of bottom wall 71 and side walls 73-1 through 73-4. Step 77 may circumscribe a recessed area 79 on bottom wall 71, wherein recessed area 79 may be dimensioned to snugly, yet removably, receive passive temperature-control member 19-6. In addition, step 77 may be dimensioned so that passive temperature-control members 19-1 through 19-4 may be snugly, yet removably, seated thereon.

Inner cover 37, which may be in the form of a unitary or one-piece member, may comprise a top wall 81, a plurality of side walls 83-1 through 83-4 extending downwardly from top wall 81, and an open bottom. Top wall 81 may be dimensioned to sit flush on top of side walls 73-1 through 73-4 of inner base 35. Side walls 83-1 through 83-4 may be spaced inwardly from the periphery of top wall 81 so as to be snugly, yet removably, received within side walls 73-1 through 73-4 of inner base 35. Side walls 83-1 through 83-4 may continuously circumscribe an area 85 on top wall 81, wherein area 85 may be dimensioned to snugly, yet removably, receive passive temperature-control member 19-5.

As can be appreciated, outer base 31 and outer cover 33 may jointly define an outer receptacle, and inner base 35 and inner cover 37 may jointly define an inner receptacle, wherein the inner receptacle may be received within the outer receptacle, wherein panels 39-1 through 39-6 may be positioned between the inner receptacle and the outer receptacle, and wherein panels 39-1 through 39-6 may be spaced apart from one another.

According to one embodiment, outer base 31, outer cover 33, inner base 35, and inner cover 37 may consist of or comprise one or more thermal insulation materials having a comparatively lower R-value, and panels 39-1 through 39-6 may consist of or comprise one or more thermal insulation materials having a comparatively higher R-value. For example, in one case, each of outer base 31, outer cover 33, inner base 35, and inner cover 37 may be made of expanded polystyrene and/or expanded polypropylene, and each of panels 39-1 through 39-6 may be vacuum insulated panels. Alternatively, in another case, each of outer base 31, outer cover 33, inner base 35 and inner cover 37 may be made of expanded polystyrene and/or expanded polypropylene, and each of panels 39-1 through 39-6 may be made of a foamed polyurethane (e.g., PUR (made from the reaction of isocyanate and polyether polyol) or PIR (made from the reaction of isocyanate and polyester polyol)). Alternatively, in still another case, each of outer base 31, outer cover 33, inner base 35 and inner cover 37 may be made of a foamed polyurethane, and each of panels 39-1 through 39-6 may be vacuum insulated panels0. Other thermal insulation materials are known to those of ordinary skill in the art and could be used pursuant to the teachings herein. For example, alternative thermal insulation materials having a relatively low R-value include natural and synthetic fibrous materials: hemp, cotton, wool, cellulosic materials like recycled paper, cardboard, recycled fabrics, polyester, polypropylene, goose down, and THINSULATE™ thermal insulation fabric for use in clothing (3M Company, Saint Paul, Minn.); inorganic materials: fiberglass, fiberglass rigid panel, and mineral wool; and other synthetic materials: polyisocyanurate foam and phenolic panels. (Where the above materials are free-flowing, they can be packaged into pouches; where they are fabrics, they can be cut, laminated, etc.) Alternative thermal insulation materials having a relatively high R-value include the family of aerogels materials including, for example, PYROGEL® aerogel-containing insulation used in the building industry (Aspen Aerogels, Inc., Northborough, Mass.).

It is to be understood that, although outer base 31, outer cover 33, inner base 35, and inner cover 37 are all said above to be made of the same type of material, this need not be the case, and some or all of the members of the group of outer base 31, outer cover 33, inner base 35, and inner cover 37 may be made of different materials than other members of said group. Similarly, it is to be understood that, although panels 39-1 through 39-6 are all said above to be made of the same type of material, this need not be the case, and some or all of the members of the group of panels 39-1 through 39-6 may be made of different materials than other members of said group. Nevertheless, despite compositional variations within these two groups of structures, the one or more types of materials used to make outer base 31, outer cover 33, inner base 35, and inner cover 37 preferably have a lower R-value than the one or more types of materials used to make panels 39-1 through 39-6.

Product box 17, which may be made of or comprise a corrugated cardboard or a similarly suitable material, may be used to removably receive temperature-sensitive materials (not shown). Product box 17 may be a generally rectangular structure and may comprise a top 18-1, a bottom 18-2, and four sides 18-3 through 18-6. (Although FIGS. 2 and 3 seem to suggest that product box 17 is a solid structure, it should be understood that product box 17 is hollow; consequently, in the ¼-cut plane views of FIGS. 2 and 3, product box 17 should be viewed as ¼ of a hollow box.) As will be discussed further below, product box 17 and temperature-control members 19-1 through 19-6 are appropriately dimensioned to be removably received within the space jointly defined by inner base 35 and inner cover 37. Adjoining sides of product box 17 meet at edges 18-7.

Each of passive temperature-control members 19-1 through 19-6 may comprise a phase-change material. More specifically, in the present embodiment, each of passive temperature-control members 19-1 through 19-6 may comprise an assembly (also sometimes referred to as a pack or a mat) comprising two generally rectangular, trough-shaped pouches 20 each containing a phase-change material. However, it is to be understood that the number and shape of pouches 20 in each of passive temperature-control members 19-1 through 19-6 are merely illustrative and may be varied while still coming within the scope of the present invention.

The phase-change material contained in pouches 20 may comprise any one or more types of phase-change materials, such as, but not limited to, an aqueous-based phase-change material (e.g., water, an aqueous salt solution, a gelled aqueous solution, etc.) and/or an organic phase-change material (e.g., one or more n-alkanes, fatty acid esters (e.g., methyl esters, such as lauric acid methyl ester (also known as methyl laurate) and myristic acid methyl ester (also known as methyl myristate)), fatty alcohols (e.g., decyl alcohol (also known as 1-decanol) and dodecyl alcohol (also known as 1-dodecanol)), and fatty acids (e.g., ricinoleic acid and caprylic acid)). Other examples of suitable phase-change materials are known to those of ordinary skill in the art.

For example, materials suitable for use as temperature-control members 19-1 through 19-6 may be similar to, but not limited to, phase-change material packs of the type disclosed in U.S. Pat. No. 9,598,622 B2, inventors Formato et al., issued Mar. 21, 2017, and U.S. Patent Application Publication No. US 2018/0093816 A1, inventors Longley et al., published Apr. 5, 2018, both of which are incorporated herein by reference. For example, according to one embodiment, each of temperature-control members 19-1 through 19-6 may be in the form of a flexible pack having two sealed pouches 20, each of the two sealed pouches containing a gelled organic phase-change material, such as is disclosed in U.S. Pat. No. 9,598,622 B2 and U.S. Patent Application Publication No. US 2018/0093816 A1. More specifically, a suitable gelled organic phase-change material may comprise, for example, one or more n-alkanes, such as n-tetradecane (C14), n-pentadecane (C15), n-hexadecane (C16), n-heptadecane (C17), n-octadecane (C18), or combinations thereof, together with a gelling agent in the form of a styrene-ethylene-butylene-styrene triblock copolymer and/or a styrene-ethylene-propylene-styrene triblock copolymer. Solely for purposes of illustration, where, for example, system 11 is designed to keep a payload within a temperature range of +2° C. to +8° C., the gelled phase-change material may comprise a mixture of n-tetradecane (C14), n-hexadecane (C16), and KRATON™ G1654 styrene-ethylene-butylene-styrene (SEBS) tri-block copolymer, and such a gelled phase-change material may have a phase-change temperature of about 3° C. Alternatively, the gelled phase-change material may comprise a mixture of n-tetradecane (C14) and KRATON™ G1654 styrene-ethylene-butylene-styrene (SEBS) tri-block copolymer, and such a gelled phase-change material may have a phase-change temperature of about 5° C. On the other hand, where, for example, system 11 is designed to keep a payload within a temperature range of +15° C. to +25° C., the gelled phase-change material may comprise a mixture of n-hexadecane (C16) and KRATON™ G1654 styrene-ethylene-butylene-styrene (SEBS) tri-block copolymer, and such a gelled phase-change material may have a phase-change temperature of about 17° C. Each of temperature-control members 19-1 through 19-6 may contain suitable masses of the phase-change material and the gelling agent for the particular application to which system 11 is put. For example, each pouch may contain approximately 150-200 g of the n-alkane(s) and approximately 12-18 g of the gelling agent.

It is to be understood that, while, in the present embodiment, all pouches 20 of passive temperature-control members 19-1 through 19-6 may contain the same quantity and type of phase-change material, this need not be so as some of temperature-control members 19-1 through 19-6 may contain different phase-change materials than others of temperature-control members 19-1 through 19-6. Moreover, one pouch 20 of a given passive temperature-control member may contain a different phase-change material than another pouch 20 of the same passive temperature-control member. In addition, although, in the present embodiment, all of passive temperature-control members 19-1 through 19-6 may be preconditioned to the same temperature prior to packout, this need not be the case. For example, some of passive temperature-control members 19-1 through 19-6 may be preconditioned to a first temperature whereas others of passive temperature-control members 19-1 through 19-6 may be preconditioned to a second temperature, wherein the first temperature and the second temperature are different temperatures. The phase-change material may be in different states at the first and second temperatures (e.g., liquid state and solid state) or may be in the same state at the first and second temperatures.

In the present embodiment, passive temperature-control members 19-1 through 19-6 may be in direct contact with product box 17. In other words, bottom 18-2 of product box 17 may be seated directly on top of passive temperature-control member 19-6, passive temperature-control member 19-5 may be seated directly above top 18-1 of product box 17, and passive temperature-control members 19-1 through 19-4 may be in direct contact with sides 18-3 through 18-6, respectively, of product box 17. Notwithstanding the above, it is to be understood that passive temperature-control members 19-1 through 19-6 need not be in direct contact with product box 17 and, instead, could be spaced from product box 17. For example, there could be one or more interposed structures between product box 17 and one or more of temperature-control members 19-1 through 19-6.

In the present embodiment, product box 17 and passive temperature-control members 19-1 through 19-6 may be dimensioned relative to one another so that the pouches 20 of a given temperature-control member 19 do not extend beyond the edges 18-7 of its respective face of product box 17. For example, as can be seen in FIG. 3, the pouch of passive temperature-control member 19-5 does not extend all the way to the edges 18-7 of top 18-1 of product box 17, the pouch of passive temperature-control member 19-6 does not extend all the way to the edges 18-7 of bottom 18-2 of product box 17, the pouches of passive temperature-control member 19-2 do not extend all the way to the edges 18-7 of side 18-4 of product box 17, and the pouches of passive temperature-control member 19-3 do not extend all the way to the edges 18-7 of side 18-5 of product box 17. In other words, in the present embodiment, the edges 18-7 at adjoining sides of product box 17 are not covered by any phase-change material.

In the present embodiment, panels 39-1 through 39-6 may be dimensioned so that, with respect to each pair of panels 39-1 through 39-6 that may be diametrically opposed to one another, the panels may generally correspond in footprint to the aggregate footprint, projected onto a plane of one of the pair of panels, of the pouches 20 that may be disposed between the pair of panels. For example, panels 39-5 and 39-6, which may be diametrically opposed to one another, may be dimensioned to correspond to the aggregate footprint, projected onto the plane of panel 39-5 or panel 39-6, of the pouches 20 of passive temperature-control members 19-1 through 19-6 disposed between panels 39-5 and 39-6. As can be appreciated, because, in the present embodiment, passive temperature-control members 19-1 through 19-6 do not extend all the way to the edges 18-7 at adjoining sides of product box 17, the edges of adjacent panels 39-1 through 39-6 may be spaced apart from one another. The spaces between these adjacent panels 39-1 through 39-6 may be occupied by the combination of inner base 35 and outer base 31 or by the combination of inner cover 37 and outer cover 33. More specifically, as can be seen, for example, by arrows 40 in FIG. 3, insulated container 15 is devoid of panels 39-1 through 39-6 between the interior edge and the exterior edge of adjoining sides of insulated container 15.

Without wishing to limit system 11 to any particular dimensions, each of panels 39-1 through 39-6 may be spaced inwardly about 2 inches from the external edges of outer base 31 and outer cover 33 and may be positioned at a depth of about 1 inch below the external surfaces of outer base 31 and outer cover 33.

It is to be understood that system 11 may comprise additional components, such as, for example, additional layers of phase-change materials and/or additional layers of insulation. However, where additional layers of phase-change materials are included, such additional layers of phase-change materials preferably are not positioned to cover the edges of the adjoining sides of product box 17. Such additional layers of phase-change material may have the same footprint as temperature-control members 19-1 through 19-6 and may contain the same phase-change material(s) as temperature-control members 19-1 through 19-6 or may contain at least some different phase-change materials therefrom. Also, such additional layers of phase-change material may be preconditioned to the same or different temperatures as some or all of temperature-control members 19-1 through 19-6.

In use, temperature-sensitive materials (not shown) may be placed within box 17, and system 11 may be assembled (i.e., "packed-out") as shown. Prior to packout, passive temperature-control members 19-1 through 19-6 may be preconditioned. In addition, one or more of the outer box, insulated container 15, and product box 17 may also be preconditioned.

Figure 4:
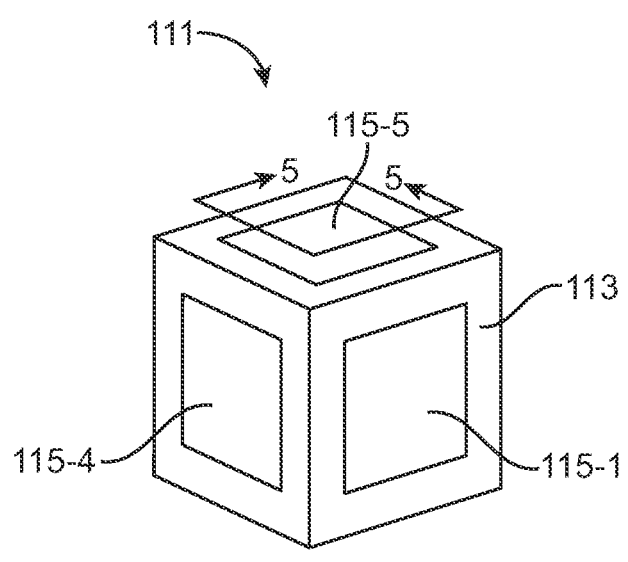
FIG. 4 is a simplified perspective view of an alternative insulated container to the insulated container shown in FIG. 1.
Figure 5:
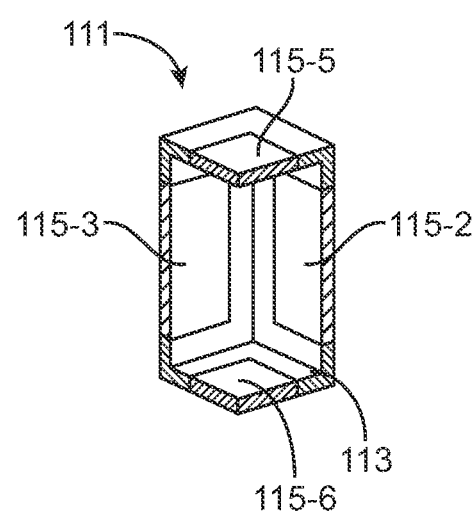
FIG. 5 is a simplified perspective view of the insulated container shown in FIG. 4, the insulated container being shown in section as a ¼-cut plane view.

Referring now to FIGS. 4 and 5, there are shown various views of an alternative embodiment of an insulated container to insulated container 15 of system 11, the alternative insulated container being constructed according to the teachings of the present invention and being represented generally by reference numeral 111. For clarity and/or ease of illustration, certain details of insulated container 111 that are discussed elsewhere in this application or that are not critical to an understanding of the invention may be omitted from one or more of FIGS. 4 and 5 and/or the accompanying description herein or may be shown in one or more of FIGS. 4 and 5 and/or described herein in a simplified manner.

Insulated container 111, which may be used in place of insulated container 15 in system 11, may comprise a frame 113 and a plurality of panels 115-1 through 115-6. Frame 113, which may comprise one or more thermal insulating materials, may have a comparatively lower R-value. Panels 115-1 through 115-6, each of which may comprise one or more thermal insulating materials, may have a comparatively higher R-value. The types of materials that may be used to make the comparatively lower and comparatively higher R-value components of insulated container 15 may also be used to make frame 113 and panels 115-1 through 115-6, respectively, of insulated container 111. Preferably, panels 115-1 through 115-6 are dimensioned similarly to panels 39-1 through 39-6 of insulated container 15. Although not shown in the present embodiment, frame 113 may be shaped to include structures for use in centering product box 17 and/or passive temperature-control members 19-1 through 19-6. Alternatively, such structures may be provided separately.

Without wishing to limit container 111 to any particular dimensions, each of panels 115-1 through 115-6 may be spaced inwardly about 2 inches from the external edges of frame 113.

Figure 6:
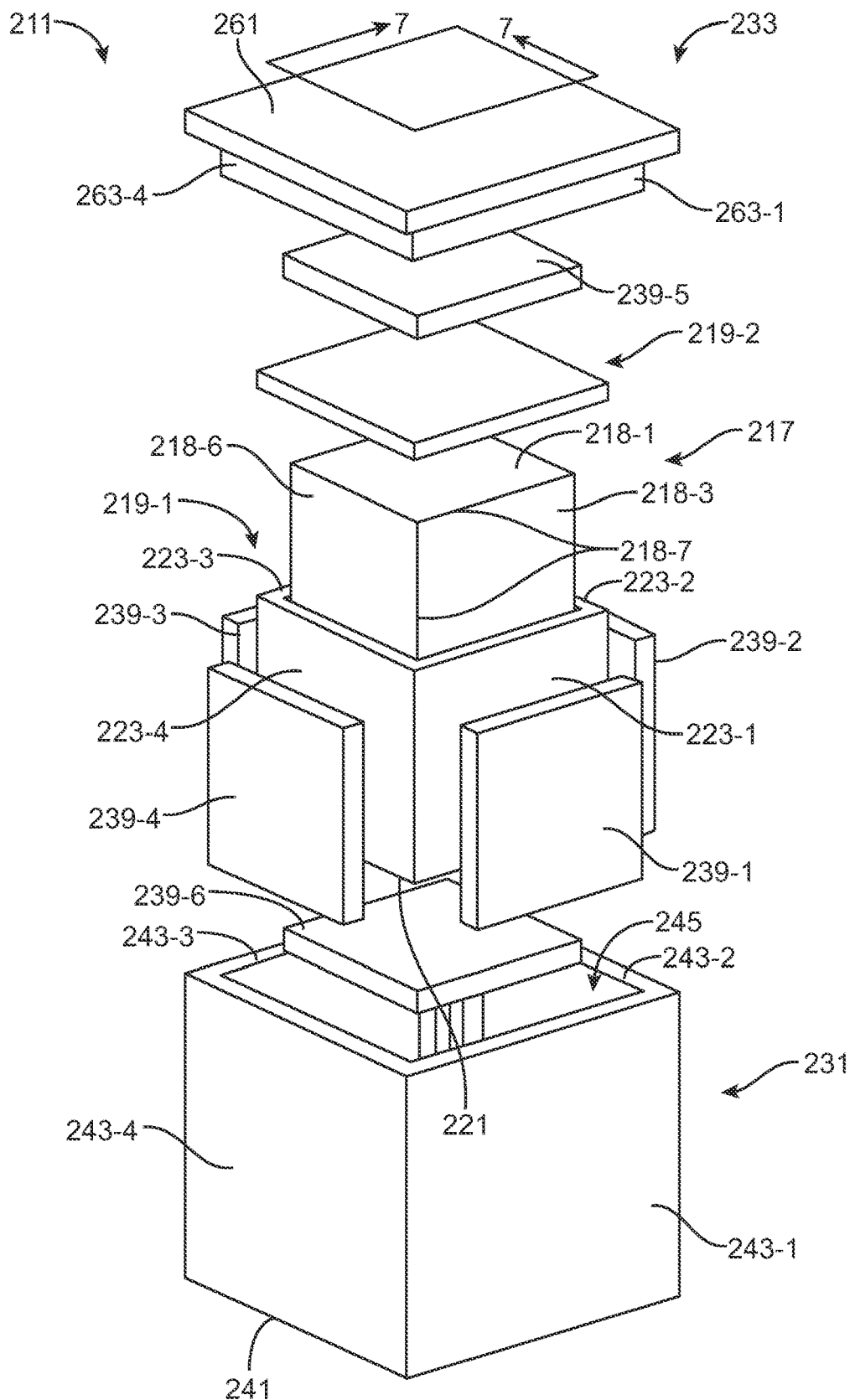
FIG. 6 is an exploded perspective view of a second embodiment of a system constructed according to the teachings of the present invention for maintaining temperature-sensitive materials within a desired temperature range for a period of time.
Figure 7:
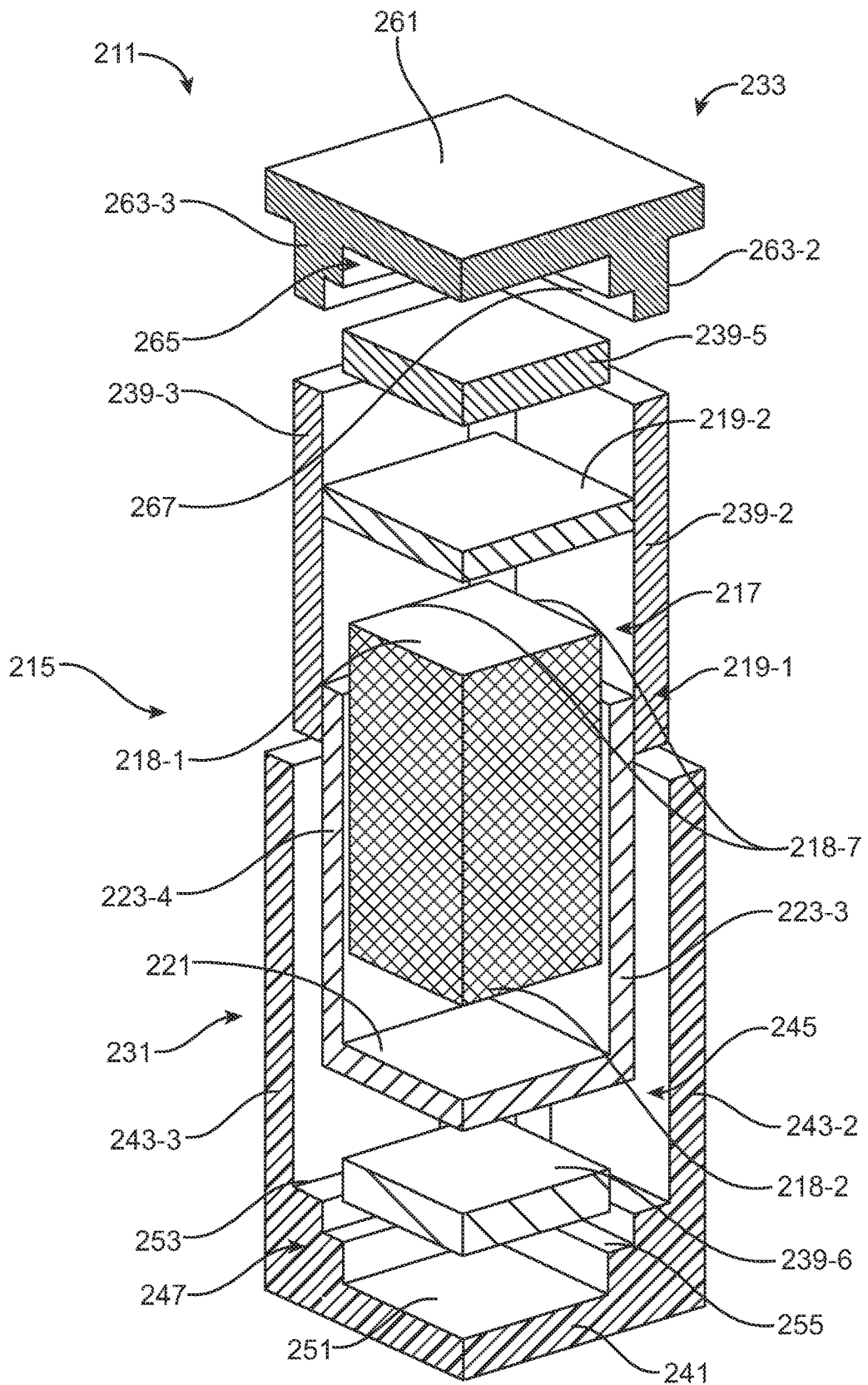
FIG. 7 is an exploded perspective view of the system of FIG. 6, the system being shown in section as a ¼-cut plane view.
Figure 8:
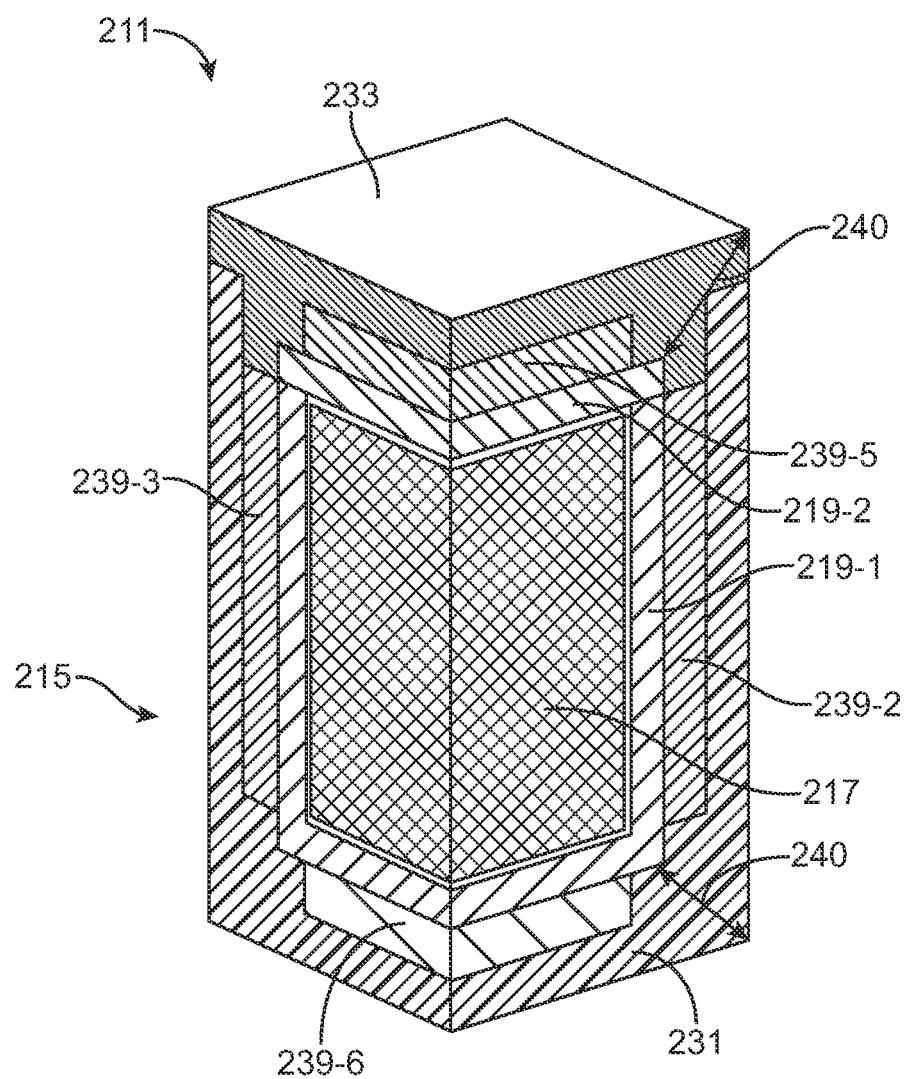
FIG. 8 is a perspective view of the system shown in FIG. 6, the system being shown in section as a ¼-cut plane view.

Referring now to FIGS. 6 through 8, there are shown various views of a second embodiment of a system for maintaining temperature-sensitive materials within a desired temperature range for a period of time, the system being constructed according to the teachings of the present invention and being represented generally by reference numeral 211. For clarity and/or ease of illustration, certain details of system 211 that are discussed elsewhere in this application or that are not critical to an understanding of the invention may be omitted from one or more of FIGS. 6 through 8 and/or the accompanying description herein or may be shown in FIGS. 6 through 8 and/or described herein in a simplified manner.

System 211 may comprise an outer box (not shown), an insulated container 215, a product box 217, and a plurality of passive temperature-control members 219-1 and 219-2.

The outer box of system 211 may be identical to the outer box of system 11.

Insulated container 215, which may be snugly, but removably, disposed within the outer box, may comprise a base 231, a cover 233, and a plurality of panels 239-1 through 239-6.

Base 231, which may be in the form of a unitary or one-piece member, may comprise a bottom wall 241, a plurality of side walls 243-1 through 243-4 extending upwardly from bottom wall 241, and an open top. Bottom wall 241 and side walls 243-1 through 243-4 may jointly define a cavity 245. In addition, bottom wall 241 and side walls 243-1 through 243-4 may jointly define a projection 247, which may extend continuously around the interior of outer base 231 at the interface of bottom wall 241 and side walls 243-1 through 243-4. Projection 247 may circumscribe a recessed area 251 on bottom wall 241, wherein recessed area 251 may be dimensioned to snugly, yet removably, receive panel 239-6. In addition, projection 247 may be shaped to include an upper step 253, upon which panels 239-1 through 239-4 may be snugly, yet removably, seated, and a lower step 255, upon which passive temperature-control member 219-1 may be snugly, yet removably, seated.

Cover 233, which may be in the form of a unitary or one-piece member, may comprise a top wall 261, a plurality of side walls 263-1 through 263-4 extending downwardly from top wall 261, and an open bottom. Top wall 261 may be dimensioned to sit flush on top of side walls 243-1 through 243-4 of base 231. Side walls 263-1 through 263-4 may be spaced inwardly from the periphery of top wall 261 so as to be snugly, yet removably, received within side walls 243-1 through 243-4 of base 231. The bottoms of side walls 263-1 through 263-4 may be seated on top of panels 239-1 through 239-4, respectively. Side walls 263-1 through 263-4 may continuously circumscribe an area 265 on top wall 261, wherein area 265 may be dimensioned to snugly, yet removably, receive panel 239-5. Each of side walls 263-1 through 263-4 may include a step 267, which may be used to snugly, yet removably, receive passive temperature-control member 219-2.

Base 231 and cover 233 may jointly define a receptacle in which product box 217, passive temperature-control members 219-1 and 219-2, and panels 239-1 through 239-6 may be received.

According to one embodiment, base 231 and cover 233 may consist of or comprise one or more thermal insulation materials having a comparatively higher R-value, and panels 239-1 through 239-6 may consist of or comprise one or more thermal insulation materials having a comparatively lower R-value. For example, in one case, each of base 231 and cover 233 may be made of vacuum insulated panels, and each of panels 239-1 through 239-6 may be made of expanded polystyrene and/or expanded polypropylene. Alternatively, in another case, each of base 231 and cover 233 may be made of a foamed polyurethane, and each of panels 239-1 through 239-6 may be made of expanded polystyrene and/or expanded polypropylene. Alternatively, in still another case, each of outer base 231 and outer cover 233 may be made of vacuum insulated panels, and each of panels 239-1 through 239-6 may be made of a foamed polyurethane. Other thermal insulation materials are known to those of ordinary skill in the art and could be used pursuant to the teachings herein. For example, alternative thermal insulation materials having a relatively low R-value include natural and synthetic fibrous materials: hemp, cotton, wool, cellulosic materials like recycled paper, cardboard, recycled fabrics, polyester, polypropylene, goose down, and THINSULATE™ thermal insulation fabric for use in clothing (3M Company, Saint Paul, Minn.); inorganic materials: fiberglass, fiberglass rigid panel, and mineral wool; and other synthetic materials: polyisocyanurate foam and phenolic panels. (Where the above materials are free-flowing, they can be packaged into pouches; where they are fabrics, they can be cut, laminated, etc.) Alternative thermal insulation materials having a relatively high R-value include the family of aerogels materials including, for example, PYROGEL® aerogel-containing insulation used in the building industry (Aspen Aerogels, Inc., Northborough, Mass.).

It is to be understood that, although base 231 and cover 233 are said above to be made of the same type of material, this need not be the case; consequently, base 231 may be made of a first type or types of material, and cover 233 may be made of a second type or types of material. Similarly, it is to be understood that, although panels 239-1 through 239-6 are said above to be made of the same type of material, this need not be the case; consequently, some or all of the members of the group of panels 239-1 through 239-6 may be made of a different type or types of materials than are other members of said group. Nevertheless, despite compositional variations within these two groups of structures, the one or more types of materials used to make base 231 and cover 233 preferably have a higher R-value than the one or more types of materials used to make panels 239-1 through 239-6.

Product box 217, which may be made of or comprise a corrugated cardboard or a similarly suitable material, may be used to removably receive temperature-sensitive materials (not shown). Product box 217 may be a generally rectangular structure and may comprise a top 218-1, a bottom 218-2, and four sides, of which sides 218-3 and 218-6 can be seen. (Although FIGS. 7 and 8 seem to suggest that product box 217 is a solid structure, it should be understood that product box 217 is hollow; consequently, in the ¼-cut plane views of FIGS. 7 and 8, product box 217 should be viewed as ¼ of a hollow box.) As will be discussed further below, product box 217 and temperature-control members 219-1 through 219-2 are appropriately dimensioned to be removably received within insulated container 215. Adjoining sides of product box 217 meet at edges 218-7.

Passive temperature-control member 219-1 and passive temperature-control member 219-2 may jointly define a rectangular cavity, in which product box 217 may be snugly, yet removably, received. More specifically, passive temperature-control member 219-1 may be shaped to comprise a bottom wall 221 and a plurality of side walls 223-1 through 223-4, wherein side walls 223-1 through 223-4 may extend upwardly from bottom wall 221. Passive temperature-control member 219-2 may be dimensioned to sit flush on top of side walls 223-1 through 223-4.

Each of passive temperature-control member 219-1 and passive temperature-control member 219-2 may comprise a phase-change material, wherein said phase-change material may be any one or more of the phase-change materials discussed above in connection with passive temperature-control members 19-1 through 19-6 of system 11. However, in contrast with passive temperature-control members 19-1 through 19-6, which may be dimensioned so that phase-change material is not positioned over the edges 18-7 of adjoining faces of product box 17, passive temperature-control members 219-1 and 219-2 may be constructed so that phase-change material is positioned over the edges 218-7 of adjoining faces of product box 217.

It is to be understood that, although passive temperature-control member 219-1 is shown in the present embodiment as comprising five walls, wherein each wall is shown as a rectangular structure of uniform thickness, one or more of the five walls of passive temperature-control member 219-1 could be shaped like passive temperature-control members 19-1 through 19-6 and could comprise two or more spaced-apart pouches. Similarly, although passive temperature-control member 219-2 is shown in the present embodiment as being a rectangular structure of uniform thickness, passive temperature-control member 219-2 could be shaped like passive temperature-control members 19-1 through 19-6 and could comprise two or more spaced-apart pouches. Nevertheless, regardless of whether each wall of passive temperature-control members 219-1 and 219-2 comprises a single volume containing phase-change material or a plurality of volumes containing phase-change material, passive temperature-control members 219-1 and 219-2 are preferably dimensioned so that phase-change material is positioned over the edges of adjoining faces of product box 217.

Also, it is to be understood that, although passive temperature-control member 219-1 is shown in the present embodiment as a unitary or one-piece structure comprising bottom wall 221 and side walls 223-1 through 223-4, passive temperature-control member 219-1 need not be a one-piece structure, and some or all of bottom wall 221 and side walls 223-1 through 223-4 could be separately constructed.

Passive temperature-control member 219-1 and passive temperature-control member 219-2 may contain different phase-change materials from one another. Moreover, in cases where passive temperature-control member 219-1 and/or passive temperature-control member 219-2 include discrete volumes of phase-change material, some of said discrete volumes may contain a different phase-change material than others of said discrete volumes. In addition, although, in the present embodiment, passive temperature-control members 219-1 and 219-2 may be preconditioned to the same temperature prior to packout, this need not be the case. Moreover, in cases where passive temperature-control member 219-1 may comprise a plurality of separable structures, some of said separable structures may be preconditioned to a first temperature and others of said separable structures may be preconditioned to a second temperature, wherein the first temperature and the second temperature are different temperatures. The phase-change material may be in different states at the first and second temperatures (e.g., liquid state and solid state) or may be in the same state at the first and second temperatures.

In the present embodiment, passive temperature-control members 219-1 and 219-2 may be in direct contact with product box 217. In other words, bottom 218-2 of product box 217 may be seated directly on top of passive temperature-control member 219-1, passive temperature-control member 219-2 may be seated directly above top 218-1 of product box 217, and the four sides of product box 217 may be in direct contact with sides 223-1 through 223-4, respectively, of passive temperature-control member 219-1. Notwithstanding the above, it is to be understood that passive temperature-control members 219-1 and 219-2 need not be in direct contact with product box 217 and, instead, could be spaced from product box 217. For example, there could be one or more interposed structures between product box 217 and one or more surfaces of temperature-control members 219-1 and 219-2.

In the present embodiment, panels 239-1 through 239-6 may be dimensioned so that each of panels 239-1 through 239-6 corresponds generally in footprint to the footprint of its corresponding face of product box 217. As can be seen, for example, by arrows 240 in FIG. 8, insulated container 215 is devoid of panels 239-1 through 239-6 between the interior edge and the exterior edge of adjoining sides of insulated container 215.

Without wishing to limit system 211 to any particular dimensions, each of panels 239-1 through 239-6 may be spaced inwardly about 2 inches from the external edges of base 231 and cover 233 and may be positioned at a depth of about 1 inch below the external surfaces of base 231 and cover 233.

It is to be understood that system 211 may comprise additional components, such as, for example, additional layers of phase-change materials and/or additional layers of insulation. Such additional layers of phase-change material may have the same footprint as temperature-control members 219-1 and 219-2 and may contain the same phase-change material(s) as temperature-control members 219-1 and 219-2 or may contain at least some different phase-change materials therefrom. Also, such additional layers of phase-change material may be preconditioned to the same or different temperatures as some or all of temperature-control members 219-1 and 219-2.

In use, temperature-sensitive materials (not shown) may be placed within box 217, and system 211 may be assembled (i.e., "packed-out") as shown. Prior to packout, passive temperature-control members 219-1 and 219-2 may be preconditioned. In addition, one or more of the outer box, insulated container 215, and product box 217 may also be preconditioned.

Figure 9:
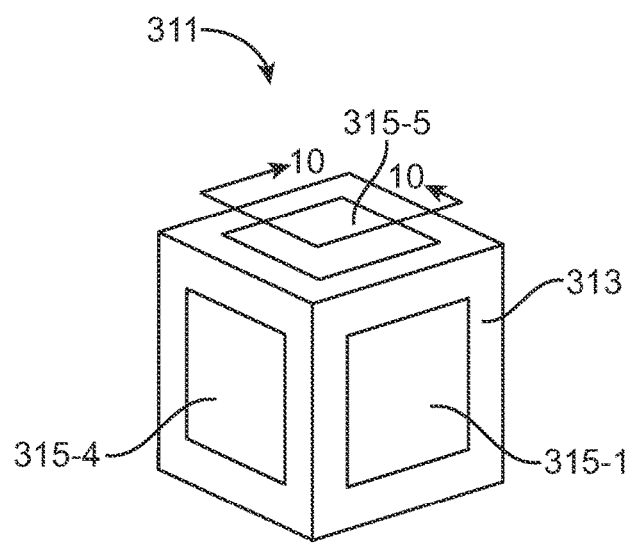
FIG. 9 is a simplified perspective view of an alternative insulated container to the insulated container shown in FIG. 6.
Figure 10:
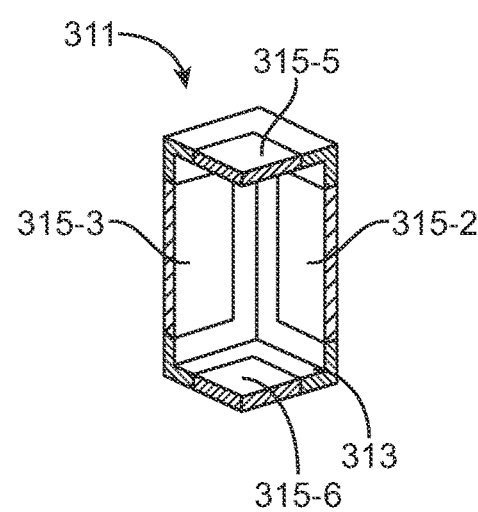
FIG. 10 is a simplified perspective view of the insulated container shown in FIG. 9, the insulated container being shown in section as a ¼-cut plane view.

Referring now to FIGS. 9 and 10, there are shown various views of an alternative embodiment of an insulated container to insulated container 215 of system 211, the alternative insulated container being constructed according to the teachings of the present invention and being represented generally by reference numeral 311. For clarity and/or ease of illustration, certain details of insulated container 311 that are discussed elsewhere in this application or that are not critical to an understanding of the invention may be omitted from one or more of FIGS. 9 and 10 and/or the accompanying description herein or may be shown in one or more of FIGS. 9 and 10 and/or described herein in a simplified manner.

Insulated container 311, which may be used in place of insulated container 215 in system 211, may comprise a frame 313 and a plurality of panels 315-1 through 315-6. Frame 313, which may comprise one or more thermal insulating materials, may have a comparatively higher R-value. Panels 315-1 through 315-6, each of which may comprise one or more thermal insulating materials, may have a comparatively lower R-value. The types of materials that may be used to make the comparatively lower and comparatively higher R-value components of insulated container 215 may also be used to make frame 313 and panels 315-1 through 315-6, respectively, of insulated container 311. Preferably, panels 315-1 through 315-6 are dimensioned similarly to panels 239-1 through 239-6 of insulated container 215. Although not shown in the present embodiment, frame 313 may be shaped to include structures for use in centering product box 217 and/or passive temperature-control members 219-1 and 219-2. Alternatively, such structures may be provided separately.

Without wishing to limit container 311 to any particular dimensions, each of panels 315-1 through 315-6 may be spaced inwardly about 2 inches from the external edges of frame 313.

As can be appreciated, systems 11 and 211 may be regarded as complementary systems. In system 11, passive temperature-control members 19-1 through 19-6 may be arranged relative to product box 17 so that no phase-change material covers the edges of adjoining sides of product box 17, and insulated container 15 may be constructed so that the insulating material having a comparatively higher R-value is spaced inwardly from the edges of adjoining sides of insulated container 15 and not along the edges of adjoining sides of insulated container 15. By contrast, in system 211, passive temperature-control members 219-1 and 219-2 may be arranged relative to product box 217 so that phase-change material covers the edges of adjoining sides of product box 217, and insulated container 215 may be constructed so that the insulating material having a comparatively higher R-value is positioned along the edges of adjoining sides of insulated container 215 and not within the central portion of each side of insulated container 215.

The present inventor has unexpectedly found that, where the phase-change material does not cover the edges of adjoining sides of a product box (as in system 11), an insulated container of the type exemplified by insulated containers 15 and 111 performs better, from a thermal standpoint, than does an insulated container of the type exemplified by insulated containers 215 and 311. By contrast, where the phase-change material covers the edges of adjoining sides of a product box (as in system 211), an insulated container of the type exemplified by insulated containers 215 and 311 performs better, from a thermal standpoint, than does an insulated container of the type exemplified by insulated containers 15 and 111. These results are surprising since there has previously been no teaching or suggestion that the positioning of phase-change materials relative to a payload should influence where a higher R-value insulation should be placed.

In view of the teachings of the present invention, where a comparatively higher R-value insulation and a comparatively lower R-value insulation are available and where the amount of the comparatively higher R-value insulation is limited to an extent that it cannot be used, by itself, to contain the payload and the phase-change materials, the placement of the comparatively higher R-value insulation should be based on whether or not the phase-change material covers the edges of adjoining sides of the product box. More specifically, if the phase-change material covers the edges of adjoining sides of the product box, the comparatively higher R-value insulation is preferentially placed at the edges of adjoining sides of the insulated container, and the comparatively lower R-value insulation is preferentially spaced inwardly from the edges. Conversely, if the phase-change material does not cover the edges of adjoining sides of the product box, the comparatively higher R-value insulation is preferentially spaced inwardly from the edges of adjoining sides of the insulated container, and the comparatively lower R-value insulation is preferentially placed at the edges of adjoining sides of the insulated container.

As can readily be appreciated, in practice, passive temperature-control members containing phase-change material are typically manufactured to be at one of a comparatively small number of different sizes. In addition, in practice, product boxes for temperature-sensitive materials are typically manufactured to be at one of a comparatively large number of different sizes. In some cases, for a product box of a given size, it may be possible to arrange passive temperature-control members around the product box so that phase-change material covers the edges of adjoining sides of the product box (as well as much of the remaining surface area of the product box). In other cases, for a product box of a given size, it may not be possible to arrange passive temperature-control members around the product box so that phase-change material covers the edges of adjoining sides of the product box. In accordance with the teachings of the present invention, it is possible to select an appropriate insulated container based on the arrangement of phase-change materials around the product box.

Figure 11:
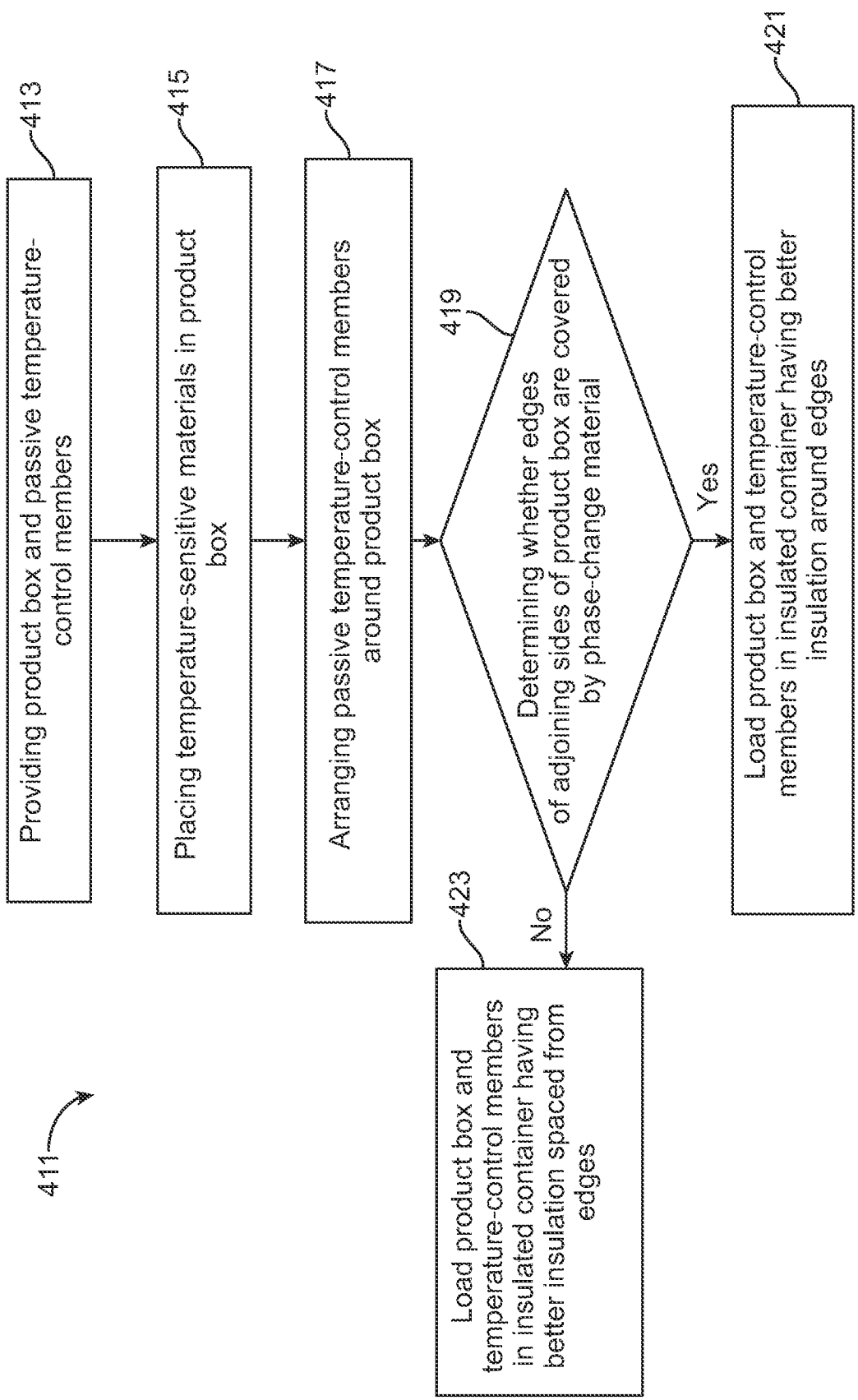
FIG. 11 is a flowchart depicting one embodiment of a method according to the present invention.

Referring now to FIG. 11, there is shown a flowchart depicting a first embodiment of a method, according to the present invention, for maintaining temperature-sensitive materials within a desired temperature range for a period of time, the method being identified generally by reference numeral 411. For simplicity, certain details of method 411 that are not critical to an understanding of the invention may be omitted from FIG. 11 and/or the accompanying description herein or may be shown in FIG. 11 and/or described herein in a simplified manner.

Method 411 may comprise a step 413. Step 413 may comprise providing a product box for receiving temperature-sensitive materials and a plurality of passive temperature-control members containing phase-change material. The product box and/or the passive temperature-control members may be preconditioned.

Method 411 may also comprise a step 415. Step 415 may comprise placing the temperature-sensitive materials within the product box.

Method 411 may also comprise a step 417. Step 417 may comprise arranging the passive temperature-control members around the product box. Preferably, said arranging comprises positioning at least one passive temperature-control member along each face of the product box.

Method 411 may also comprise a step 419. Step 419 may comprise determining whether the edges of adjoining sides of the product box are covered by the phase-change material of the passive temperature-control members.

If the edges of adjoining sides of the product box are covered by the phase-change material of the passive temperature-control members, step 419 of method 411 may be followed by a step 421. Step 421 may comprise loading the product box and the passive temperature-control members into a first type of insulated container, the first type of insulated container comprising a first insulating material and a second insulating material, the first insulating material having a comparatively higher R-value and being located at least at the edges of adjoining surfaces of the insulated container, the second insulating material having a comparatively lower R-value and being located only at locations spaced inwardly from the edges of adjoining surfaces of the insulated container. Examples of the first type of insulated container may include containers 215 and 311. The first type of insulated container may be preconditioned.

If the edges of adjoining sides of the product box are not covered by the phase-change material of the passive temperature-control members, step 419 of method 411 may be followed by a step 423. Step 423 may comprise loading the product box and the passive temperature-control members into a second type of insulated container, the second type of insulated container comprising a first insulating material and a second insulating material, the first insulating material having a comparatively lower R-value and being located at least at the edges of adjoining surfaces of the insulated container, the second insulating material having a comparatively higher R-value and being located only at locations spaced inwardly from the edges of adjoining surfaces of the insulated container. Examples of the second type of insulated container may include containers 15 and 111. The second type of insulated container may be preconditioned.

It is to be understood that, although method 411 is described above as having a plurality of steps, such steps need not be performed in the sequence set forth above, except to the extent explicitly set forth above and/or to the extent logically required.

Although the present invention has been discussed in the context of a parcel shipper, it is to be understood that the precepts of the present invention could be applied to a pallet shipper or to a pallet cover.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for maintaining temperature-sensitive materials within a desired temperature range for a period of time, the system comprising:
   (a) a product box, the product box being shaped to comprise a plurality of sides, wherein adjoining sides of the product box meet at an edge;
   (b) at least one passive temperature-control member, the at least one passive temperature-control member comprising at least one phase-change material, wherein the at least one passive temperature-control member is positioned relative to the product box so that the at least one phase-change material does not cover any edges of the product box;
   (c) an insulated container, the insulated container being shaped to include a plurality of sides, wherein adjoining sides of the insulated container meet at an interior edge and at an exterior edge, wherein the plurality of sides collectively define a cavity for receiving the product box and the at least one passive temperature-control member, the insulated container comprising a first insulating material and a second insulating material, wherein the first insulating material has a first R-value, wherein the second insulating material has a second R-value, wherein the first R-value is higher than the second R-value, wherein the insulated container is devoid of the first insulating material between the interior edge and the exterior edge of adjoining sides, wherein the insulated container comprises an outer receptacle, an inner receptacle, and a plurality of panels, wherein the inner receptacle is disposed within the outer receptacle, wherein the plurality of panels is disposed between the inner receptacle and the outer receptacle, wherein the outer receptacle comprises the second insulating material, and wherein the plurality of panels comprises the first insulating material.

2. The system as claimed in claim 1 wherein the product box is a rectangular cuboid and comprises six sides.

3. The system as claimed in claim 1 wherein the at least one passive temperature-control member comprises a plurality of passive temperature-control members.

4. The system as claimed in claim 1 wherein the product box has six sides and wherein the at least one phase-change material is positioned along an exterior portion of each of the six sides of the product box but not along any of the edges of the product box.

5. The system as claimed in claim 1 wherein the at least one phase-change material is exactly one type of phase-change material.

6. The system as claimed in claim 1 wherein the at least one phase-change material comprises a plurality of different types of phase-change material.

7. The system as claimed in claim 1 wherein the first insulating material comprises a vacuum insulated panel and wherein the second insulating material comprises at least one material selected from the group consisting of expanded polystyrene, expanded polypropylene, and a polyurethane foam.

8. The system as claimed in claim 1 wherein the first insulating material comprises a polyurethane foam and wherein the second insulating material comprises a material selected from the group consisting of expanded polystyrene and expanded polypropylene.

9. A system for maintaining temperature-sensitive materials within a desired temperature range for a period of time, the system comprising:
(a) a product box, the product box being shaped to comprise a plurality of sides, wherein adjoining sides of the product box meet at an edge;
(b) at least one passive temperature-control member, the at least one passive temperature-control member comprising at least one phase-change material, wherein the at least one passive temperature-control member is positioned relative to the product box so that the at least one phase-change material does not cover any edges of the product box; and
(c) an insulated container, the insulated container being shaped to include a plurality of sides, wherein adjoining sides of the insulated container meet at an interior edge and at an exterior edge, wherein the plurality of sides collectively define a cavity for receiving the product box and the at least one passive temperature-control member, the insulated container comprising a first insulating material and a second insulating material, wherein the first insulating material has a first R-value, wherein the second insulating material has a second R-value, wherein the first R-value is higher than the second R-value, and wherein the insulated container is devoid of the first insulating material between the interior edge and the exterior edge of adjoining sides;
(d) wherein the insulated container comprises an outer receptacle, an inner receptacle, and a plurality of panels, wherein the inner receptacle is disposed within the outer receptacle, wherein the plurality of panels is disposed between the inner receptacle and the outer receptacle, wherein each of the outer receptacle and the inner receptacle comprises the second insulating material and wherein the plurality of panels comprises the first insulating material.

\* \* \* \* \*